United States Patent
Harke et al.

(10) Patent No.: US 12,259,329 B2
(45) Date of Patent: Mar. 25, 2025

(54) METHOD OF DISTURBANCE CORRECTION, AND LASER SCANNING MICROSCOPE HAVING DISTURBANCE CORRECTION

(71) Applicant: ABBERIOR INSTRUMENTS GMBH, Göttingen (DE)

(72) Inventors: Benjamin Harke, Göttingen (DE); Roman Schmidt, Göttingen (DE); Lars Kastrup, Göttingen (DE)

(73) Assignee: ABBERIOR INSTRUMENTS GMBH, Gottingen (DE)

(*) Notice: Subject to any disclaimer, the term of this patent is extended or adjusted under 35 U.S.C. 154(b) by 365 days.

(21) Appl. No.: 17/782,784

(22) PCT Filed: Dec. 14, 2020

(86) PCT No.: PCT/EP2020/085893
§ 371 (c)(1),
(2) Date: Jun. 6, 2022

(87) PCT Pub. No.: WO2021/122407
PCT Pub. Date: Jun. 24, 2021

(65) Prior Publication Data
US 2023/0003651 A1  Jan. 5, 2023

(30) Foreign Application Priority Data

Dec. 21, 2019  (DE) .......................... 102019008989.8

(51) Int. Cl.
*G01N 21/64*  (2006.01)
*G02B 21/00*  (2006.01)

(52) U.S. Cl.
CPC ..... *G01N 21/6458* (2013.01); *G01N 21/6428* (2013.01); *G02B 21/0032* (2013.01);
(Continued)

(58) Field of Classification Search
None
See application file for complete search history.

(56) References Cited

U.S. PATENT DOCUMENTS 6,958,470 B2 * 10/2005 Hoffmann .......... G02B 21/0032
  250/234
7,485,875 B2 *  2/2009 Wolleschensky .. G02B 21/0076
  250/458.1
(Continued)

FOREIGN PATENT DOCUMENTS

DE       19959228 A1    6/2001
DE    102010017630 A1   12/2011
(Continued)

OTHER PUBLICATIONS

C. Geisler et al., "Drift estimation for single marker switching based imaging schemes", Optics Express 20, 7274 (2012).
(Continued)

*Primary Examiner* — Marcus H Taningco
*Assistant Examiner* — Djura Malevic
(74) *Attorney, Agent, or Firm* — MOSER TABOADA

(57) ABSTRACT

The present disclosure is directed to a method of disturbance correction and to a laser scanning microscope carrying out this method. Specifically, it is directed to an image recording method according to the MINFLUX principle, in which a spatially isolated fluorescence dye molecule is illuminated at a sequence of scan positions by an intensity distribution with a local intensity minimum, and the number of fluorescence photons emitted by the fluorescence dye molecule is detected at each of the scan positions. The location of the molecule is determined with a high spatial resolution from the scan positions and the numbers of fluorescence photons. A disturbance is captured when illuminating the fluorescence dye molecule and detecting the fluorescence light,
(Continued)

said disturbance being considered in corrective fashion when determining the location of the fluorescence dye molecule.

20 Claims, 8 Drawing Sheets

(52) U.S. Cl.
CPC ....... *G02B 21/006* (2013.01); *G02B 21/0072* (2013.01); *G02B 21/0076* (2013.01); *G01N 2021/6439* (2013.01)

(56) References Cited

U.S. PATENT DOCUMENTS

| | | | | |
|---|---|---|---|---|
| 7,539,115 | B2* | 5/2009 | Hell | G03F 7/70375 |
| | | | | 369/13.01 |
| 7,709,809 | B2* | 5/2010 | Kempe | G02B 21/0076 |
| | | | | 250/458.1 |
| 7,903,247 | B2* | 3/2011 | Dyba | G01N 21/6458 |
| | | | | 356/318 |
| 8,362,448 | B2* | 1/2013 | Wolleschensky | G02B 21/10 |
| | | | | 250/459.1 |
| 8,704,196 | B2* | 4/2014 | Wolleschensky | G01N 21/6458 |
| | | | | 250/458.1 |
| 9,024,279 | B2* | 5/2015 | Hell | G01N 21/6428 |
| | | | | 250/459.1 |
| 9,291,562 | B2* | 3/2016 | Hell | G01N 15/10 |
| 9,389,404 | B2* | 7/2016 | Fölling | G02B 21/16 |
| 9,528,923 | B2* | 12/2016 | Nakata | G01N 21/6458 |
| 9,719,928 | B2* | 8/2017 | Hell | G02B 27/58 |
| 9,720,221 | B2* | 8/2017 | Dyba | G02B 21/16 |
| 9,772,485 | B2* | 9/2017 | Dyba | G02B 27/58 |
| 9,835,838 | B2* | 12/2017 | Hell | G02B 21/0032 |
| 9,964,749 | B2* | 5/2018 | Park | G02B 21/16 |
| 10,585,274 | B2* | 3/2020 | Seidel | G01B 11/026 |
| 10,900,901 | B2* | 1/2021 | Balzarotti | G02B 21/0076 |
| 10,908,089 | B2* | 2/2021 | Balzarotti | G02B 21/365 |
| 10,955,348 | B2* | 3/2021 | Hell | G01N 21/6428 |
| 10,962,479 | B2* | 3/2021 | Balzarotti | G01N 21/6458 |
| 11,221,476 | B2* | 1/2022 | Betzig | G02B 21/367 |
| 11,754,847 | B2* | 9/2023 | Engelhardt | G02B 21/16 |
| | | | | 250/362 |
| 11,815,458 | B2* | 11/2023 | Prince | G02B 7/32 |
| 11,930,278 | B2* | 3/2024 | Westwick | A61B 90/30 |
| 12,001,004 | B2* | 6/2024 | Betzig | G02B 27/0025 |
| 2002/0163715 | A1* | 11/2002 | Engelhardt | G02B 21/245 |
| | | | | 359/368 |
| 2006/0028716 | A1* | 2/2006 | Gilbert | G02B 21/26 |
| | | | | 359/368 |
| 2007/0206278 | A1* | 9/2007 | Dyba | G02B 21/0076 |
| | | | | 359/385 |
| 2012/0319007 | A1* | 12/2012 | Kempe | G01N 21/6458 |
| | | | | 250/459.1 |
| 2012/0327209 | A1* | 12/2012 | Fölling | G02B 21/16 |
| | | | | 348/79 |
| 2013/0128025 | A1* | 5/2013 | Dyba | G02B 21/365 |
| | | | | 348/79 |
| 2013/0222568 | A1* | 8/2013 | Dyba | G02B 27/58 |
| | | | | 348/79 |
| 2016/0305884 | A1* | 10/2016 | Hell | G02B 21/008 |
| 2019/0011690 | A1* | 1/2019 | Seidel | G03F 1/84 |
| 2019/0113731 | A1* | 4/2019 | Betzig | G01N 21/64 |
| 2021/0208411 | A1* | 7/2021 | Engelhardt | G01N 21/6458 |
| 2023/0003651 | A1* | 1/2023 | Harke | G02B 21/0076 |

FOREIGN PATENT DOCUMENTS

| | | |
|---|---|---|
| DE | 102010036709 A1 | 2/2012 |
| DE | 102017104736 B3 | 8/2018 |
| DE | 102017115367 A1 | 1/2019 |
| EP | 1258767 A1 | 11/2002 |
| EP | 1548485 A1 | 6/2005 |
| EP | 2538262 A2 | 12/2012 |
| WO | WO-2004034124 A1 | 4/2004 |
| WO | WO-2015097000 A1 | 7/2015 |
| WO | WO-2019120502 A1 | 6/2019 |

OTHER PUBLICATIONS

R. McGorty, D. Kamiyama, B. Huang, "Active microscope stabilization in three dimensions using image correlation", Optical Nanoscopy 2 (1), 3 (2013).

J. Prescher, "Assembly and optimization of a super-resolution STORM microscope for nanoscopic imaging of biological structures", Dissertation, München (2016).

Francisco Balzarotti et al., "Supplementary Material for Nanometer resolution imaging and tracking of fluorescent molecules with minimal photon fluxes", Science, US, vol. 355, No. 6325, Dec. 22, 2016 (Dec. 22, 2016), pp. 606-612, DOI: 10.1126/science.aak9913.

International Search Report for application No. PCT/EP2020/085893, dated Apr. 7, 2021.

* cited by examiner

METHOD OF DISTURBANCE CORRECTION, AND LASER SCANNING MICROSCOPE HAVING DISTURBANCE CORRECTION

BACKGROUND OF THE INVENTION

Field of the Invention

In microscopic imaging of objects, a task is to keep the relative position between the imaging system and the object to be imaged constant and stable for the duration of the image acquisition. The requirements for position stabilization depend on the spatial resolution to be achieved when imaging the object.

With the development of high-resolution methods in fluorescence microscopy, especially STED microscopy, PALM/STORM microscopy and most recently MINFLUX microscopy, the resolving power of optical imaging methods has increased from diffraction-limited resolution (approx. 250 nm) to the range of a few nanometers. However, in order to actually realize the resolving power of these methods, the relative position between the sample, the optics and the light beams must be kept respectively stable to a few nanometers. Corresponding requirements have so far been known mainly from the fields of electron and atomic force microscopy as well as interferometry.

Significant disturbance factors in imaging using high-resolution light microscopy are, in particular, temperature fluctuations, vibrations transmitted to the imaging system via the building and the floor, air flows caused by ventilation systems, and noise sources.

In order to minimize the influence of vibrations transmitted through the building, a favorable installation location is therefore usually chosen in this respect, for example in basement rooms, and passively and/or actively damped table systems are used. Temperature fluctuations are reduced to a minimum by using high-quality control and air-conditioning technology, and air currents in the area of the image recording system can also be greatly reduced with suitable air routing.

Slow drifts of the sample relative to the microscope objective due to thermal expansion of the microscope components can also be reduced on the instrument side with suitable mechanical designs and by selecting materials with small thermal expansion coefficients.

However, the minimization of disturbances and the aforementioned design measures are often not sufficient to meet the stability requirements in the range of a few nanometers imposed by the high-resolution methods.

Description of the Prior Art

The publication WO 2015/097000 A1 describes a method, now known by the acronym MINFLUX, for the localization of spatially isolated fluorescent molecules, in which each of the individual molecules is illuminated at different positions with an intensity distribution of excitation light comprising an intensity minimum. For each of the illumination positions, the fluorescence emission excited by the excitation light is registered, and the location of the respective molecule is inferred from the course of the intensity of the fluorescence light along the positions of the intensity minimum. Naturally, this location determination is subject to error, but the error of the location determination can be reduced by applying the method iteratively. For this purpose, the illumination positions are adjusted before each iteration step, i.e., they are arranged closer around the assumed location of the molecule. At the same time, the strength of the excitation light is increased so that the intensity gradient increases near the intensity minimum. Alternatively, the measurement duration can be increased, which corresponds to an increase in the strength of the excitation light with respect to the amount of effective light. With the adjusted parameters, the molecule is illuminated successively at each of the adjusted illumination positions and the intensity of the fluorescence emission is registered. From the dependence of the fluorescence signal on the positions of the intensity minimum, the location of the molecule can now be determined with less error than before. These process steps can be repeated until convergence of the location determination or until another termination criterion is reached, for example a predetermined maximum acceptable error. With an achievable localization accuracy of approx. 1 nm, the MINFLUX method represents the most precise commercially available localization method for fluorescent molecules according to the current state of the art.

WO 2015/097000 A1 further discloses that a (high-resolution) image of the distribution of the molecules in the sample can be obtained from the location data of the individual molecules ("MINFLUX imaging"). This method corresponds to the procedures generally known from STORM and PALM microscopy for generating high-resolution images from a large number of location determinations of individual fluorescent molecules, but in the case of MINFLUX microscopy results in a further increased spatial resolution of the images of 5 nm.

DE 10 2017 104 736 B3 describes a variant of the MINFLUX method in which the scanning of the isolated fluorescence dye molecules is not performed by illuminating with an intensity distribution of excitation light having a local intensity minimum, but with two essentially complementary intensity distributions of an excitation light and a fluorescence-preventing light. Therein, the intensity distribution of the excitation light comprises a local intensity maximum, while the intensity distribution of the fluorescence-preventing light has a local intensity minimum at the same location. Specifically, the fluorescence-preventing light may be STED light, which prevents excited fluorescence dye molecules from emitting fluorescence photons by triggering stimulated emission in the edge regions of the intensity distribution of the excitation light. In this embodiment of the method, the excitation light and the fluorescence-preventing light are thus superimposed with such intensity distributions as is also done in RESOLFT and STED microscopy. This variant of the MINFLUX method takes advantage of the fact that the intensity of the fluorescence light registered for the respective fluorescence dye molecule depends on its distance from the local intensity minimum of the fluorescence-preventing light, and that its position can be determined with high accuracy from the intensities of the fluorescence light registered for several positions of the intensity minimum of the fluorescence-preventing light. Also with this variant of the MINFLUX method, the local intensity minimum can be positioned at few positions in the sample and the evaluation of the intensities of the registered fluorescence light can be carried out according to the same principles as with MINFLUX microscopy. However, the difference remains that in MINFLUX microscopy the intensity of the fluorescence light from the fluorescent marker increases with increasing distance of its position to the position of the local intensity minimum, whereas in the embodiment of the method in which the further light is fluorescence-preventing light, it decreases with increasing distance.

From STORM and PALM microscopy, the problem is known that the sample to be imaged moves relative to the microscope system during data acquisition, which compromises localization accuracy. In image reconstruction, this leads to motion blur and washed-out looking images. Corresponding to the increased localization accuracy, this problem applies to a greater extent when localizing molecules using the MINFLUX method. Here, acceptable relative movements between the sample and the microscope system are in the range of 1 nm or less.

Various approaches to sample stabilization are known from the prior art, in particular for STORM and PALM microscopy, whereby either a readjustment of the sample position during the duration of the data acquisition or a subsequent correction of the image data is proposed.

A laser scanning microscope with a temperature sensor is known from DE 199 59 228 A1, in which the focus position is adjusted by a correction value determined from a calibration curve for the respective current temperature. However, this method is limited to the correction of thermal drifts in the axial direction, i.e., the focusing.

In EP 1 548 485 A1, a method and a microscope executing this method are proposed in which images of a preferably immobile object are taken at different times, wherein a motion estimator is used to calculate the drift between the image captures, in which the drift detection takes place via the comparison of corresponding blocks (and possibly subblocks) of the images.

The drifts determined for the blocks individually can then be calculated into an overall drift. The actual correction can be done either by subsequent processing of the image data or by tracking the beam or sample position during image acquisition.

R. McGorty, D. Kamiyama, B. Huang, "Active microscope stabilization in three dimensions using image correlation", Optical Nanoscopy 2 (1), 3 (2013) discloses a method in which sample drift is compensated for by tracking a piezo-driven sample stage to within 10 nm in the x and y directions and 20 nm in the z direction. The sample drift is determined by cross-correlating transmitted light images of the sample with a reference transmitted light image, whereby the drift in the x- and y directions is determined from the position of the maximum of the cross-correlation and the drift in the z-direction from its amplitude. To acquire the transmitted light images, the sample is transilluminated with infrared light, which does not influence the fluorescence imaging.

J. Prescher, "Assembly and optimization of a super-resolution STORM microscope for nanoscopic imaging of biological structures", PhD thesis, Munich (2016), describes a method for lateral drift correction in PALM/STORM microscopy, for which fluorescent nanoparticles are introduced into the sample as reference objects. To determine the drift of the sample in x- and y-direction, epifluorescence images of these nanoparticles are repeatedly taken during the STORM data acquisition and correlated with a reference epifluorescence image taken at the beginning. From the position of the maximum of the cross-correlation, the drift in x- and y-direction is determined for the respective time point and used for the location correction in the localization of the fluorescent single molecules.

From C. Geisler et al, "Drift estimation for single marker switching based imaging schemes", Optics Express 20, 7274 (2012), a method for drift correction in STORM/PALM microscopy is known that is also based on the correlation of multiple camera (raw) images, but in which the sample drift is determined as a function of time by pairwise correlation of all camera (raw) images, not just by correlation with a single reference image. Without having to make any other assumptions about the cause or nature of the drift, or modifying the data acquisition, accuracy in single-molecule localization can be greatly improved.

Although some of the methods mentioned can also be applied to short-term, transient disturbances, such as those caused by building vibrations, sound or by air currents, the disclosures mainly focus on the correction of slow drift phenomena.

SUMMARY OF THE INVENTION

The present disclosure is based on the objective of providing a method and an associated laser scanning microscope with which a high localization accuracy can be achieved even if disturbances occurring during data acquisition according to the MINFLUX method cannot be avoided. In particular, short-term/transient disturbances are to be addressed.

Solution

The objective of the present disclosure is attained by a method according to independent claim 1, a method according to independent claim 7 and a laser scanning microscope carrying out one of these methods and having the features of independent claim 19 or 20. Dependent claims 2 to 6 and 8 to 18 concern preferred embodiments of the methods.

The term laser scanning microscope is understood here in its broad meaning, i.e., in addition to microscopes in which the scanning of the image field is effected by a beam deflection unit, the term laser scanning microscope also covers microscopes in which the scanning of the sample is effected, for example, by moving a sample stage or by moving the objective.

The solution disclosed herein is based on the applicant's realization that, in addition to low-frequency disturbances which can be suppressed or compensated for with methods known from the prior art, high-frequency disturbances often occur in a short-term manner, i.e., are temporary. In this context, short-term means that the disturbances comprise periods of time that are small compared to the duration of an image acquisition according to the MINFLUX method described below; the periods of time may also be small compared to the duration of a localization of an individual fluorescence dye molecule coupled to a structure in a sample. One aspect of the present disclosure is based on the realization that even measured values obtained under the influence of deleterious disturbance may nevertheless contain relevant information for localization and/or for imaging, but in particular also with respect to tracking movements of fluorescence dye molecules coupled to a structure in a sample.

Both methods for determining the locations of individual fluorescence dye molecules coupled to a structure in a sample comprise the method steps known from the prior art i) sequential illumination of an individual, spatially isolated fluorescence dye molecule by an intensity distribution of an excitation light comprising a local intensity minimum or by an intensity distribution of the excitation light and an intensity distribution of a fluorescence-preventing light comprising a local intensity minimum and substantially complementary to the intensity distribution of the excitation light, (ii) detecting the number of fluorescence photons of the fluorescence light and assigning the number of fluorescence photons to the respective scan position at each step of the sequence; iii) determining the location of the fluorescence dye molecule from the set of associated numbers of fluorescent photons and scan positions with an accuracy below a dimension of a diffraction limited volume in a spatial direction.

The first method according to the present disclosure differs from the prior art in that the magnitude of a disturbance is determined during illumination of the sample and in that a weighting factor is assigned to each element of the set of associated numbers of fluorescence photons and scan positions, the value of which is determined from the magnitude of the disturbance during the detection of the fluorescence photons at the respective scan position, and that in determining the location of the fluorescence dye molecule the elements of the set of assigned numbers of fluorescence photons and scan positions are taken into account according to their weighting factor.

The second method according to the present disclosure, which is based on the same basic idea as the first, differs from the prior art in that the magnitude of a disturbance is determined during the illumination of the sample and that the illumination of the dye molecule at the sequence of scan positions and the detection of the fluorescence photons is interrupted when the magnitude of the disturbance exceeds a first limit value.

A laser scanning microscope according to the present disclosure comprises at least: (i) a laser light source for providing excitation light; (ii) optionally, a laser light source for providing fluorescence-preventing light; (iii) a phase modulation element in a beam path of the excitation light or in a beam path of the fluorescence-preventing light; (iv) an objective focusing the excitation light into a sample and receiving fluorescence light from the sample; (v) a beam deflection device; and (vi) a detector for fluorescence light received from the sample. It differs from the prior art in that it comprises a measuring device for detecting a disturbance and in that it is adapted to carry out the method according to the present disclosure.

The method according to the present disclosure is a method for the highly accurate determination of locations of individual fluorescence dye molecules coupled to a structure in a sample, which is based on the MINFLUX method known from the prior art but improves it in that disturbances occurring during data acquisition are detected and taken into account in the localization of the fluorescence dye molecules.

To carry out the method according to the present disclosure, an individual, spatially isolated fluorescence dye molecule is illuminated by an intensity distribution of an excitation light comprising a local intensity minimum or by an intensity distribution of the excitation light and an intensity distribution of a fluorescence-preventing light comprising a local intensity minimum and being substantially complementary to the intensity distribution of the excitation light and is excited to emit fluorescence light. The illumination of the fluorescence dye molecule is performed sequentially at a sequence of different scan positions of the local intensity minimum, which are arranged around the location of the fluorescence dye molecule and whose distance from the location of the fluorescence dye molecule is usually in the order of magnitude of the optical diffraction limit or below, i.e., in the range of 250 nm or less.

To determine the scan positions, approximate knowledge of the location of the fluorescence dye molecule is necessary in advance. This information can be obtained, for example, by previously taking a (coarse resolution) confocal image or an epifluorescence image of the sample or the region of interest of the sample taken with a camera. Alternatively, the sample can be scanned with the intensity distribution of the excitation light until the fluorescence light of a fluorescence dye molecule is detected. The current scan position can then be used to determine the sequence of scan positions of the intensity minimum.

Due to practical considerations, the intensity distribution of the excitation light comprising a local intensity minimum or the intensity distribution of the fluorescence-preventing light comprising a local intensity minimum will usually have the same shape at the different scan positions, although this is not mandatory; rather, illumination at the different scan positions can also take place with different shapes of the intensity distribution and, in particular, with different strengths. It is only important that the intensity distribution of the excitation light or the fluorescence-preventing light has a local intensity minimum, wherein the local minimum can be point-shaped, line-shaped or formed as a surface. Such intensity distributions can be generated by phase modulation of the wavefront of the light and are extensively known from the prior art.

At each illumination step of the sequence of scan positions of the local intensity minimum, the fluorescence light emitted by the dye molecule is detected and the number of fluorescence photons is assigned to the respective scan position. Optionally, time stamps can also be added to the pairs of values, which can be used at a later time to assign independently collected measurements of a disturbance, as explained further below. Depending on the emission rate of the fluorescence photons and the number of photons that individual molecules of the fluorescence dye emit on average before they bleach or enter a dark state, it may be useful to repeat the illumination of the dye molecule at the or at a new sequence of scan positions. It is particularly advantageous to update the scan positions on the basis of a first or a previous location determination of the fluorescence dye molecule according to the scheme explained below, and to arrange the scan positions more densely around the location of the dye molecule. Adjusting, in particular increasing, the overall intensity of the intensity distribution exhibiting a local intensity minimum can also improve the accuracy of the location determination. In each case, the sequence of scan positions can be determined completely before the start of illumination at the scan positions, for example to the vertices of a polygon centered around the assumed location of the fluorescence dye molecule (for a two-dimensional location determination) or to the vertices of a polyhedron centered around the assumed location of the fluorescence dye molecule (for a three-dimensional location determination) of the fluorescence dye molecule. Alternatively, the sequence of scan positions can also be adjusted dynamically, i.e., between successive scan positions of the sequence, taking into account the numbers of fluorescence photons detected at the preceding scan positions.

According to the present disclosure, a disturbance is detected during the detection of the fluorescence light at the scan positions. In a preferred embodiment of the method, a weighting factor is assigned to each pair of values of the set of associated numbers of fluorescence photons and scan positions, the value of which is determined from the magnitude of the disturbance during the detection of the fluorescence photons at the respective scan position.

Therein, the measurement of the disturbance and the determination of the weighting factors can be synchronized with the detection of the fluorescence photons, so that the time or time interval of the disturbance measurement and the corresponding fluorescence detection coincide. Alternatively, the disturbance can be detected continuously, and the value of the disturbance stored at regular intervals. By temporal correlation, a weighting factor can thus be assigned retrospectively to each element of the set of associated numbers of fluorescence photons and scan positions of the local intensity minimum. In this case, the disturbance measurement can also be carried out with an independently operating measuring device.

From the set of assigned numbers of fluorescence photons and scan positions, the location of the fluorescence dye molecule can be calculated with an accuracy far below the optical diffraction limit. In the simplest case, this is done by forming the sum of the location vectors of the scan positions weighted by the numbers of fluorescence photons. A common, much more accurate method is based on a maximum likelihood estimator (MLE), where a parabolic approximation is usually assumed for the intensity distribution near the local intensity minimum. For the state of the art in this respect, reference should be made, by way of example, to F. Balzarotti et al., "Nanometer resolution imaging and tracking of fluorescent molecules with minimal photon fluxes", Science 355, 606 (2017) including the corresponding Supplementary Material (the latter available at https://science.sciencemag.org/content/suppl/2016/12/21/science.aak9913.DC1).

For the determination of the location of the fluorescence dye molecule according to the present disclosure, the calculation methods known from the prior art can be used in principle; however, they must be modified in such a way that the value pairs from the assigned numbers of fluorescence photons and scan positions are included in the calculation to a different extent, for example multiplicatively, according to their weighting factors. The weighting factors can also assume the value zero in order to disregard the respective value pair from the number of fluorescence photons and the associated scan position in the location determination. Alternatively, other, also nonlinear functional dependencies from the weighting factors can be realized. Values intervals can also be formed for the weighting factor, whereby all pairs of values from the number of fluorescence photons and the associated scan position whose weighting factors lie in the same value interval are included in the location determination with the same weight. This procedure corresponds to a discretization of the weighting factors. In the extreme case, the discretized weighting factors only represent binary values or truth values that indicate whether a disturbance occurred during the detection of the fluorescence photons or whether the disturbance exceeded a limit value.

The weighting factors can also be used to calculate error limits or confidence intervals for the scan positions. By using an error propagation calculation, for example according to ISO/IEC Guide 98-3:2008: *Uncertainty of measurement—Part 3: Guide to the expression of uncertainty in measurement.* ISO, Geneva 2008, ISBN 92-67-10188-9, a (more well-founded) confidence interval for the calculated location of the fluorescence dye molecule can be derived.

In a further preferred embodiment of the method according to the present disclosure, the illumination of the fluorescence dye molecule and the detection of the fluorescence photons is interrupted when the disturbance detected in parallel exceeds a first limit value. Therein, the measurement can be definitively interrupted or resumed when the value falls below a second limit value. The second limit value can be selected identically to the first limit value; however, it is advantageous to select the second limit value (slightly) smaller than the first limit value so that there is a hysteresis between interruption and resumption of the measurement and no rapid interruption and resumption cycles occur. In order to avoid a freezing of the data recording, a time limit is preferably set after which the measurement is interrupted if the value of the disturbance has not yet fallen below the second limit value (again).

According to the present disclosure, the location of an individual fluorescence dye molecule can be determined several times in succession, so that the location can be specified as a function of time ("tracking"). From such data series, trajectories of individual dye molecules in a sample and especially within a biological cell can be created and graphically displayed. With the help of these trajectories, diffusion phenomena and molecular interactions, for example, can be studied with high spatial resolution. The embodiment of the method described at the beginning is particularly suitable for this application, in which weighting factors are assigned to the associated numbers of fluorescence photons and scan positions, but data acquisition is continuous. Interrupting the data recording when a threshold value of the disturbance is exceeded is less suitable for tracking applications because there is a risk that the fluorescence molecule moves out of the range of the scan positions during the interruption phases and is located outside the scan positions at a later time (after the disturbance has subsided) so that it can no longer be localized.

The method according to the present disclosure can also be used to determine the locations of several different dye molecules. As is known from the prior art for PALM and STORM microscopy, a spatially high-resolution image of the structure labelled with the fluorescence dye in the sample can be generated by displaying the coordinates resulting from the location determination, for example, in the form of a two-dimensional histogram or a similar representation.

Insofar as fluorescence dye molecules are spatially separated, i.e., at a distance of more than one diffraction limit, the location determination can also be carried out on several fluorescence dye molecules simultaneously or quasi-simultaneously, provided that means are available for the simultaneous but independent illumination and detection of fluorescence photons of several fluorescence dye molecules. Spatially isolated fluorescence dye molecules can be achieved, for example, by using an appropriately high dilution of the dye when labelling the sample. However, in order to be able to generate a high-resolution image of the structure that is as spatially continuous as possible, it is necessary that the structure is labelled with many fluorescence dye molecules arranged in high density and that the locations of a sufficiently large part of these fluorescence dye molecules are determined. This typically requires the location determination of several thousand fluorescence dye molecules. However, the high labelling density with fluorescence dye molecules means that only a small proportion of the dye molecules may be present in a fluorescent state at any one time in order to be able to meet the requirement that fluorescent molecules be present individually and spatially isolated. In usual embodiments of the method according to the present disclosure, one will therefore resort to photo switchable fluorescence dyes, such as are also known from PALM/STORM microscopy. Photo switchable fluorescence dyes have a fluorescent state in which the dye can be excited with excitation light of suitable wavelength to emit fluorescence, and further have a dark state in which the dye cannot be excited with the excitation light to emit fluorescence. In this case, the dye can be photoactivated at least once, i.e., transferred from the dark state to the fluorescent state. Photoactivation is often light-induced, i.e., by illumination with photoactivation light of suitable wavelength (usually in the blue-violet spectral range) but can also occur spontaneously. Depending on the type of fluorescence dye, photoactivation can also be reversible, i.e., several activation-deactivation switching cycles can be run through, whereby photo-deactivation can also be light-induced or spontaneous. A typical switching mechanism is the (reversible) transition from the fluorescent state to a transient dark state, for example a triplet state. The switching kinetics of these transitions can be adapted to the respective requirements via the solvent composition, by adding redox reagents and/or by controlling the oxygen concentration in the sample.

A laser scanning microscope according to the present disclosure comprises an excitation light source for providing excitation light and optionally a light source for providing fluorescence-preventing light, a phase modulation element in a beam path of the excitation light or the fluorescence-preventing light, an objective which focuses the excitation light and optionally the fluorescence-preventing light into a sample and receives fluorescence light from the sample, a beam deflection device, a detector for fluorescence light received from the sample and a measuring device for detecting a disturbance, wherein the laser scanning microscope is adapted to carry out the method according to the present disclosure. Preferred embodiments of the laser scanning microscope according to the present disclosure can be seen in particular in FIGS. 6 to 10.

Disturbances that often affect single-molecule location determination methods include beside temperature fluctuations in particular vibrations and oscillations transmitted from the building to the microscope, and in many cases air currents caused by ventilation systems. Especially with the highest-resolution methods, sound and even speech are often sources of disturbance. Furthermore, in addition to slow temperature fluctuations, usually caused by inadequate air conditioning technology, faster temperature fluctuations can also occur, for example when doors are opened between rooms of different temperatures. A large number of commercially available sensors are available for the (quantitative) detection of such disturbances. Of particular interest for the method according to the present disclosure and the laser scanning microscope carrying out the method according to the present disclosure are therefore above all vibration sensors, acceleration sensors, optical, capacitive or inductive distance sensors, position sensors, microphones, pressure sensors, flow sensors and temperature sensors. Many of these sensors are commercially available in miniaturized form, with high sensitivity and often even at low cost, and can be integrated directly into a laser scanning microscope according to the present disclosure and read out by the control system of the laser scanning microscope. By integrating the sensor into the laser scanning microscope, it is easy to synchronize the illumination and detection of the fluorescence photons with the measurement of the disturbance.

However, disturbances can also be detected independently of illuminating the fluorescence dye molecule and detecting the fluorescence photons, for example with a sensor whose measured values are continuously acquired and recorded with a data logger. In this case, it is necessary that both the elements of the set of assigned numbers of fluorescence photons and scan positions on the one hand and the measured values of the disturbance on the other hand are provided with time stamps so that an assignment of both measurements to each other is possible afterwards.

The detection of the disturbance can also be integrated into a beam path of the laser scanning microscope according to the present disclosure. For this purpose, a small part of the excitation light and/or the fluorescence-preventing light can be decoupled from the beam path of the excitation light and/or the fluorescence light and directed onto a light detector. Under the influence of disturbances, not only the position of the focused excitation light and possibly of the focused fluorescence-preventing light in the sample changes, but also the position of the coupled-out part of the excitation light and/or the coupled-out part on the light detector. In order to detect these (slight) changes in position, the light detector can be designed as a position-sensitive detector (PSD) or as a segmented detector, in particular also in the form of a camera. A particularly high sensitivity can be achieved if an interferometer is arranged in front of the light detector, which translates even the slightest disturbances, in particular vibrations or air currents, into easily detectable brightness variations. A further increase in sensitivity can be achieved if the interference pattern is recorded with a spatially resolving detector, especially a camera, and the interference pattern is examined for changes by image processing. In this way, it is also possible to detect disturbances in the beam position that lie far below the wavelength of the light.

Instead of decoupling a small part of the excitation light and/or the fluorescence-preventing light from the beam path, it is alternatively possible to use a separate measuring light beam provided by an auxiliary light source. In this case, it is advantageous to select the wavelength of the auxiliary light so that it lies spectrally outside the excitation and emission range of the fluorescence dye, for example in the infrared spectral range. When using a measuring light beam provided by an auxiliary light source, it must be ensured that it is influenced by the disturbance to be detected in a similar way as the excitation light beam and/or the fluorescence-preventing light beam, but at least allows a significant statement about the magnitude of the disturbance of the excitation light beam and/or the fluorescence-preventing light beam. Optionally, the measuring light beam provided by the auxiliary light source can be coupled into the beam path of the excitation light and/or the fluorescence-preventing light in such a way that the measuring light beam runs along at least a section of the beam path together with the beam of the excitation light and/or the fluorescence-preventing light. However, it is also possible to guide the measuring light beam independently of the excitation light beam and/or the fluorescence-preventing light beam as long as it is influenced by disturbances in a similar way as the excitation light beam and/or the fluorescence-preventing light beam, for example as a result of a mechanical coupling of the beam guiding elements of both beam paths.

In an advantageous further development of the present disclosure, two or more sensors positioned at different locations can also be provided in order to more accurately detect spatially varying disturbances such as air currents. The measuring device for detecting the disturbance can also be designed in such a way that several types of disturbance are detected simultaneously, for example vibrations, air flows and noises. For this purpose, the measuring device may comprise a combination of different ones of the mentioned sensors. If several types of disturbance are detected simultaneously, the weighting factor can be calculated from the values of all disturbances or derived from the strongest disturbance in each case. Alternatively, the illumination of the fluorescence molecule can be interrupted as long as the value of one of the disturbances is above a limit value defined for this disturbance.

In further advantageous embodiments of the present disclosure, it may be provided that the measuring device for detecting the disturbance is configured to send a signal indirectly or directly to a display device; on the display device, information about the strength of disturbances may be displayed, it may be displayed whether a measurement has been interrupted or aborted, or whether a measurement has been terminated as scheduled. Such a display device may preferably be placed spatially away from the laser scanning microscope so that actions of the operator performing the experiment, such as talking, do not interfere with the measurement.

In a further advantageous embodiment of the present disclosure, the signal of the measuring device for detecting the disturbance can be used to perform a beam position correction during the illumination of the fluorescence dye molecule and the detection of the fluorescence light. For this purpose, a correction value can be calculated in real time from the magnitude of the disturbance, by which the control signal of the beam deflection device according to the present disclosure, in particular of the electro-optical deflectors, is corrected and thus the scan position of the intensity minimum of the excitation light in the sample is kept at its desired position.

Advantageously, this correction can also be applied without a simultaneous realization of all other features of the present disclosure and in this respect constitutes a separate present disclosure.

According to a further advantageous embodiment of the first or second method, the intensity distribution comprising the local intensity minimum is the same for all scan positions except for a translation.

According to a further advantageous embodiment of the first method, the magnitude of the disturbance is stored as a function of time.

According to a further advantageous embodiment of the first method, the weighting factor is assigned the value zero if during the detection of the fluorescence photons the magnitude of the disturbance has reached or exceeded a threshold value.

According to a further advantageous embodiment of the first method, discrete values are assigned to the weighting factors, particularly wherein the discrete values are binary values indicating the presence or absence or exceeding of a limit value of the disturbance.

According to a further advantageous embodiment of the second method, the illumination of the fluorescence dye molecule at the sequence of scan positions is continued when the magnitude of the disturbance falls below a second limit value, particularly wherein the second limit value is smaller than the first limit value.

According to a further advantageous embodiment of the first or second method, the disturbance is detected with a vibration sensor, an acceleration sensor, an optical, capacitive or inductive distance sensor, a position sensor, a microphone, a pressure sensor, a flow sensor, a temperature sensor or with a combination of different such sensors.

According to a further advantageous embodiment of the first or second method, the disturbance is detected by decoupling a small part of the excitation light from a beam path of the excitation light and directing it onto a light detector. In particular, the light detector is configured as a position-sensitive detector and/or as a segmented detector. In particular, an interferometer is arranged in front of the light detector.

According to a further advantageous embodiment of the first or second method, the disturbance is detected by means of a measuring light beam and a light detector. In particular, the light detector is configured as a position-sensitive detector and/or as a segmented detector. In particular, an interferometer is arranged in front of the light detector.

According to a further advantageous embodiment of the first or second method, the location of the fluorescence dye molecule is determined repeatedly.

According to a further advantageous embodiment of the first or second method, a trajectory of the fluorescence dye molecule in the sample is generated from the locations of the fluorescence dye molecule.

According to a further advantageous embodiment of the first or second method, the locations of several different dye molecules are determined by the method.

According to a further advantageous embodiment of the first or second method, a high-resolution image of the structure in the sample is generated from the locations of the dye molecules.

According to a further advantageous embodiment of the laser scanning microscope, the measuring device for detecting the disturbance comprises a vibration sensor, an acceleration sensor, an optical, capacitive or inductive distance sensor, a position sensor, a microphone, a pressure sensor, a flow sensor, a temperature sensor or a combination of different such sensors.

According to a further advantageous embodiment of the laser scanning microscope, the measuring device for detecting the disturbance comprises a measuring light beam and a light detector.

According to a further advantageous embodiment of the laser scanning microscope, the measuring device for detecting the disturbance comprises a beam splitter arranged in the beam path of the excitation light, wherein the beam splitter is configured to decouple a part of the excitation light from the beam path of the excitation light and to direct it onto the light detector.

According to a further advantageous embodiment of the laser scanning microscope, the measuring device for detecting the disturbance comprises a beam splitter arranged in the beam path of the fluorescence preventing light, wherein the beam splitter is configured to decouple a part of the fluorescence-preventing light from the beam path of the fluorescence-preventing light and to direct it onto the light detector.

According to a further advantageous embodiment of the laser scanning microscope, the light detector is configured as a position-sensitive detector or as a segmented detector.

According to a further advantageous embodiment of the laser scanning microscope, an interferometer is arranged in front of the light detector.

Further advantageous embodiments of the present disclosure may be derived from the claims, the description and the drawings. The advantages of features and of combinations of several features described in the description are merely exemplary and may have an alternative or cumulative effect without the advantages necessarily having to be achieved by embodiments according to the present disclosure. Without this changing the subject-matter of the appended claims, the following applies with regard to the disclosure content of the original application documents and the patent: further features are to be taken from the drawings—in particular the geometries shown and the relative dimensions of several components to one another and their relative arrangement and operative connection. The combination of features of different embodiments of the present disclosure or of features of different claims is also possible in deviation from the chosen references of the patent claims and is hereby suggested. This also applies to those features which are shown in separate figures or are mentioned in the description thereof. These features may also be combined with features of different claims. Likewise, features listed in the claims may be omitted for further embodiments of the present disclosure.

The indefinite article "a" or "an" used in the claims and the description for a feature is to be understood in such a way that, with regard to the number, it can be exactly one or also several implementations of this feature without requiring an explicit use of the adverb "at least". The features listed in the claims may be supplemented by further features, if necessary, or may also be the only features which the respective method or the laser scanning microscope comprises.

DETAILED DESCRIPTION

Figure 1:
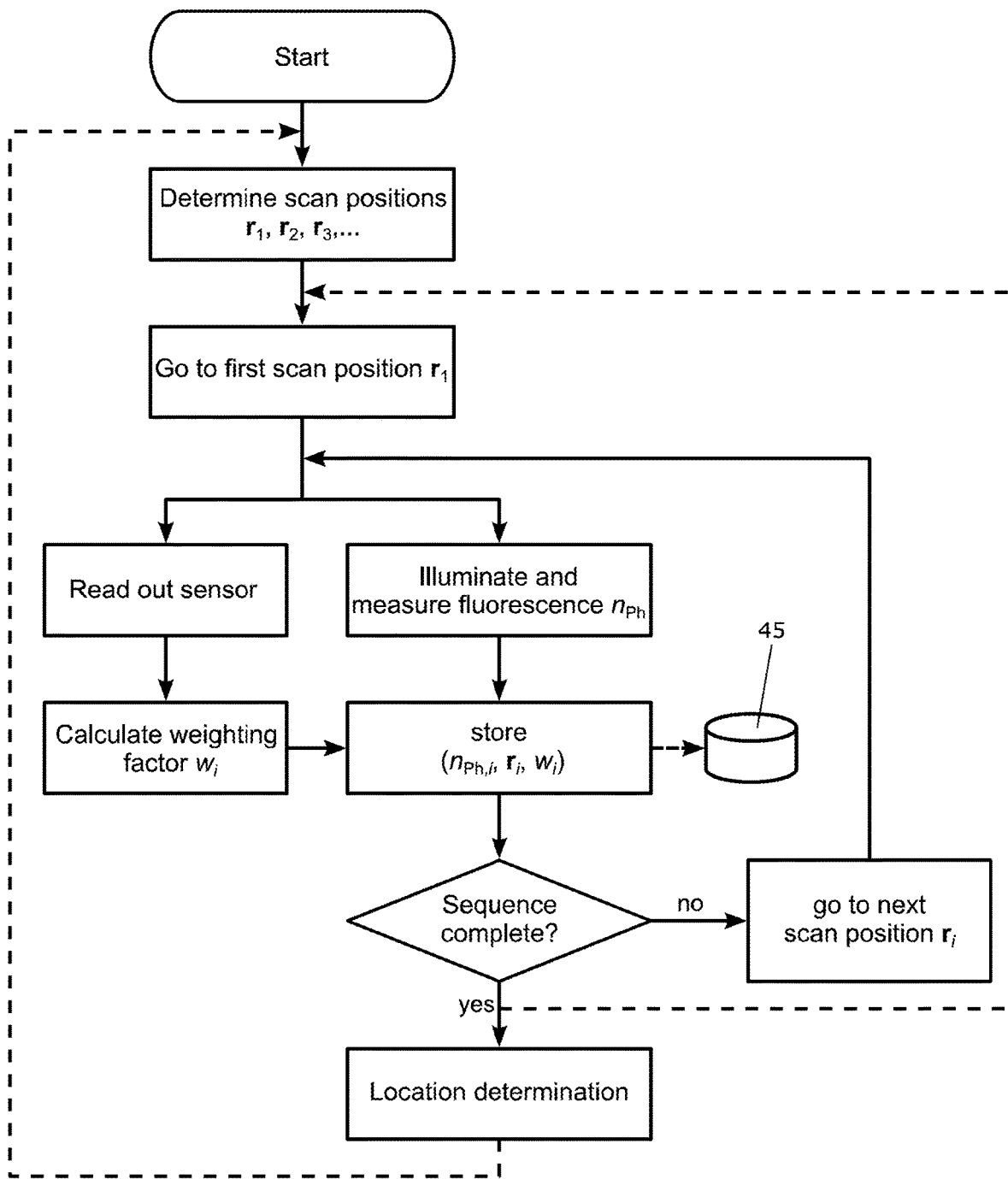
FIG. 1 shows a preferred embodiment of the method according to the present disclosure in the form of a flow chart.

FIG. 1 shows a flow chart for a preferred embodiment of the method according to the present disclosure. Here it is presupposed that fluorescence dye molecules 3 in a fluorescent state 22 are present in isolated form in a sample 2, that a single, spatially isolated fluorescence dye molecule 3 has been selected for the location determination and that its approximate location 1 in the sample 2 is known. For the establishment of these conditions, reference is made to the description of the present disclosure. For the location determination according to the method according to the present disclosure, in the first step a sequence 8 of scan positions 9 $r_1, r_2, r_3, \ldots$ is determined, wherein the scan positions 9 are arranged around the assumed location 1 of the selected fluorescence dye molecule 3. Subsequently, the fluorescence dye molecule 3 is illuminated with an intensity distribution 5 of excitation light 6 having a local intensity minimum 4, wherein the intensity minimum 4 is initially positioned at the first scan position 9 $r_i$, i=1. During illumination, the fluorescence photons emitted by the fluorescence dye molecule 3 as a result of the illumination are detected and the value of a sensor 32 indicating a disturbance is read out. After calculating the weighting factor $w_i$ from the measured value of the sensor 32, the number $n_{Ph,i}$ of detected fluorescence photons, the scan position 9 and the weighting factor are stored as a tuple 44 of the form ($n_{Ph,i}$, $r_i$, $w_i$) in a data memory 45. The illumination and detection of the fluorescence photons and the measurement of the disturbance is continued for all further scan positions 9 $r_i$, i=2, 3, . . . of the sequence 8. After scanning all scan positions 9 of the sequence 8, the sequence 8 as a whole can be repeated to improve the signal-to-noise ratio. After data collection, the location of the fluorescence dye molecule 3 is determined taking into account the weighting factor associated with each data point, resulting in a greatly improved estimate of the location 1 of the fluorescence dye molecule 3 compared to the initial estimate. If the desired accuracy of the location determination is not yet achieved, the procedure can be repeated with newly determined scan positions 9 and possibly an increased total intensity of the excitation light 6.

Figure 2:
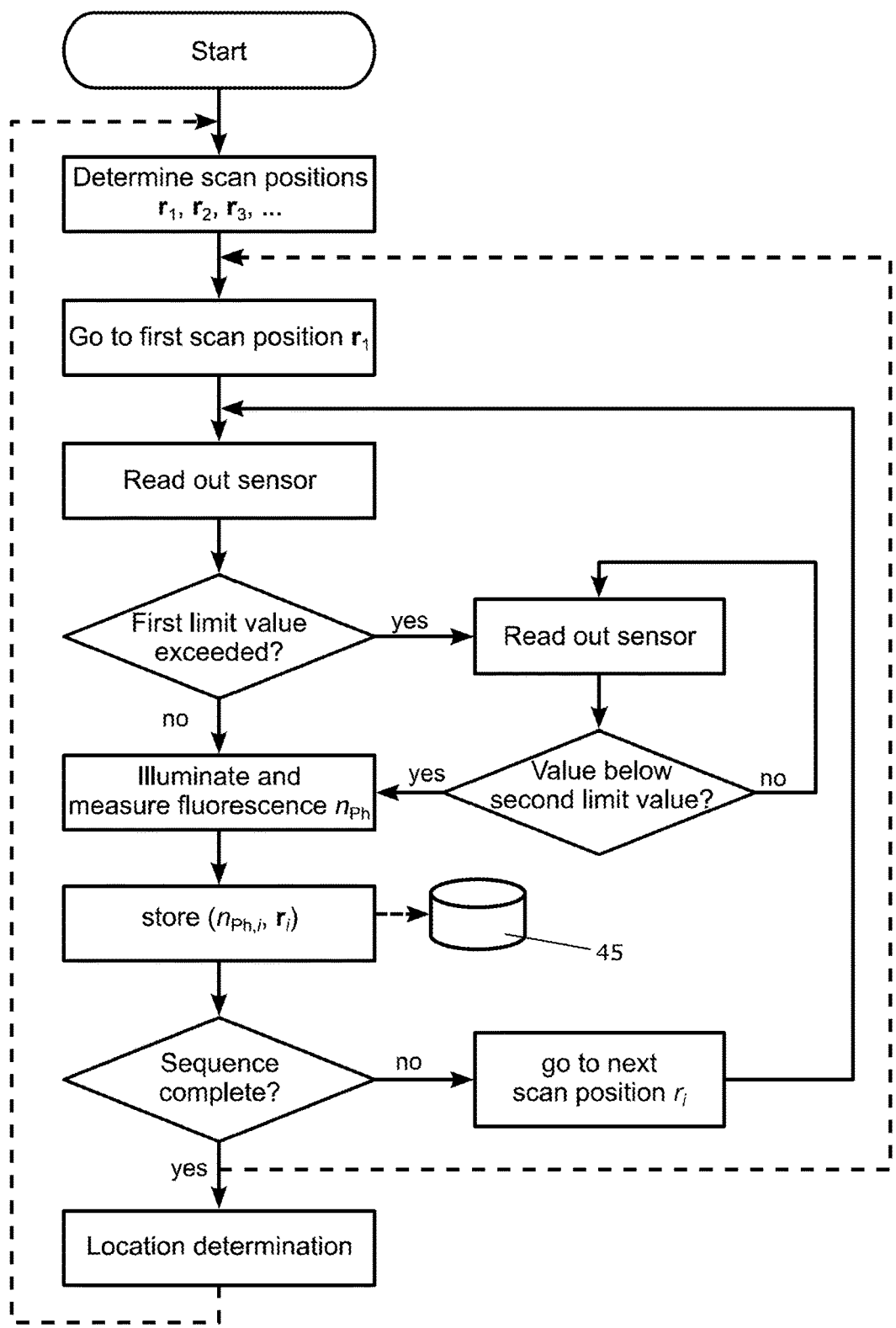
FIG. 2 shows a further preferred embodiment of the method according to the present disclosure in the form of a flow chart.

FIG. 2 shows a flow chart for a further preferred embodiment of the method according to the present disclosure. As before, it is assumed that fluorescence dye molecules 3 in a fluorescent state 22 are present in isolated form in the sample 2, that a single, spatially isolated fluorescence dye molecule 3 has been selected for the location determination and that its approximate location 1 in the sample 2 is known. In the first step, a sequence 8 $r_1, r_2, r_3, \ldots$ of scan positions is again determined, the scan positions being arranged around the assumed location 1 of the selected molecule. The intensity minimum 4 of the excitation light 6 is positioned at the first of the previously determined scan positions 9 $r_i$, i=1. Now the value of the sensor 32 indicating a disturbance is read out. If the value of the disturbance exceeds a first limit value 20, the data recording is paused until the value of the disturbance falls below a second limit value 21, wherein the second limit value 21 is preferably set slightly lower than the first limit value 20. Subsequently, the illumination of the fluorescence dye molecule 3 with excitation light 6 and the detection of the fluorescence photons is continued and a value pair $r_i$) consisting of the number $n_{Ph,i}$ of detected fluorescence photons and the scan position 9 $r_i$ is stored in a data memory 45. The illumination and detection of the fluorescence photons is continued for all further scan positions 9 $r_i$, i=2, 3, . . . of the sequence 8, wherein a check is made before each illumination/detection step as to whether the first limit value 20 of the disturbance has been exceeded and, if necessary, the data recording is interrupted until the value falls below the second limit value 21 again. After scanning all scan positions 9 of the sequence 8, the sequence 8 can be repeated as a whole to improve the signal-to-noise ratio. After data collection, the location of the fluorescence dye molecule 3 is determined, resulting in a much-improved estimate of the location 1 of the fluorescence dye molecule 3 compared to the initial estimate. If the desired accuracy of the location determination is not yet achieved, the method can be repeated with newly determined scan positions 9 and possibly an increased total intensity of the excitation light.

Figure 3:
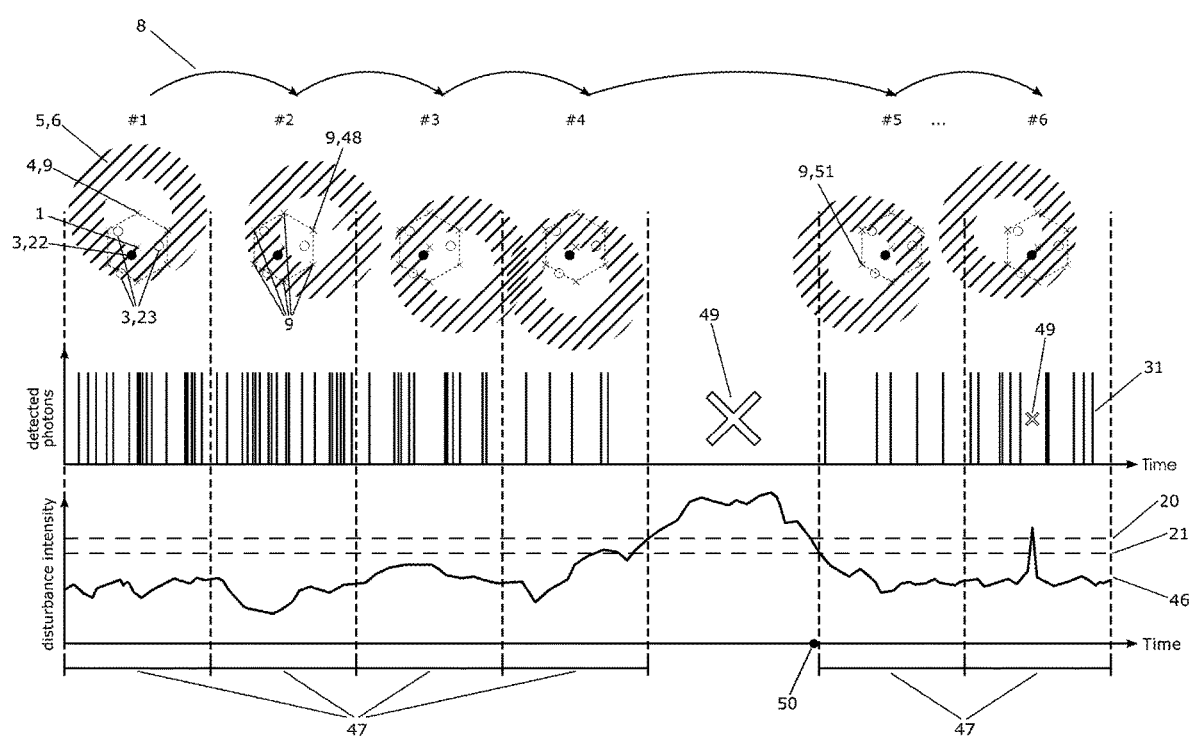
FIG. 3 illustrates the time sequence of the data recording according to the embodiment of the method according to the present disclosure shown in FIG. 2.

FIG. 3 illustrates in detail the sequence of data acquisition in the embodiment of the method according to the present disclosure shown in FIG. 2 (simulated data). In the sample 2 there is a structure stained with fluorescence dye molecules 3, wherein the area to be scanned comprises only a single dye molecule 3 in the fluorescent state 22, while neighboring dye molecules 3 are in a dark state 23. A sequence 8 of scan positions 9 is defined around the assumed location 1 of the fluorescent molecule 3, 22. First, the magnitude of the disturbance signal 46 is determined by means of a measuring device 17 not shown in this figure, and the disturbance signal 46 is compared with a first limit value 20. At the beginning of the first scanning step #1, the disturbance signal 46 is below the first limit value 20, whereupon the illumination of the dye molecule 3 with the intensity distribution 5 of excitation light 6 having a local intensity minimum 4 is started at the first scan position 9 and the fluorescence photons emitted by the fluorescence dye molecule 3, 22 are detected for the duration of the first illumination interval 47. The counting events 31 caused by the fluorescence photons are summed up for the first illumination interval 47 and assigned to the first scan position 9. At the beginning of the second scanning step #2, the disturbance signal 46 continues to be below the first limit value 20, whereupon the intensity minimum 4 of the intensity distribution 5 is positioned at the second scan position 48 and the fluorescence photons emitted by the fluorescence dye molecule 3, 22 are detected for the duration of the second illumination interval 47. The counting events 31 are summed and assigned to the second scan position 48. The process is continued up to and including the fourth scanning step #4. After the end of scanning step #4, the disturbance signal 46 is above the first limit value 20 and the illumination process is temporarily interrupted. The interruption 49 is maintained until the time 50 when the disturbance signal 46 has fallen below the second limit value 21 again. Only then is the intensity minimum 4 of the intensity distribution 5 positioned at the fifth scan position 51 and the fluorescence photons emitted by the fluorescence dye molecule 3,22 are detected for the duration of the fifth illumination interval 47. The accumulated counting events 31 are assigned to the fifth scan position 51. At the beginning of the subsequent scanning steps, the disturbance signal 46 is still below the first limit value 20, which is why the illumination and detection of the fluorescence light is continued as described. In the course of illuminating the fluorescent molecule 3, 22 at the sixth scan position, the first limit value 20 of the disturbance is briefly exceeded again, which is why the illumination and detection of the fluorescence photons is briefly interrupted once more. The illumination interval can be extended by the duration of this interruption 49 to ensure equally long detection intervals.

Figure 4:
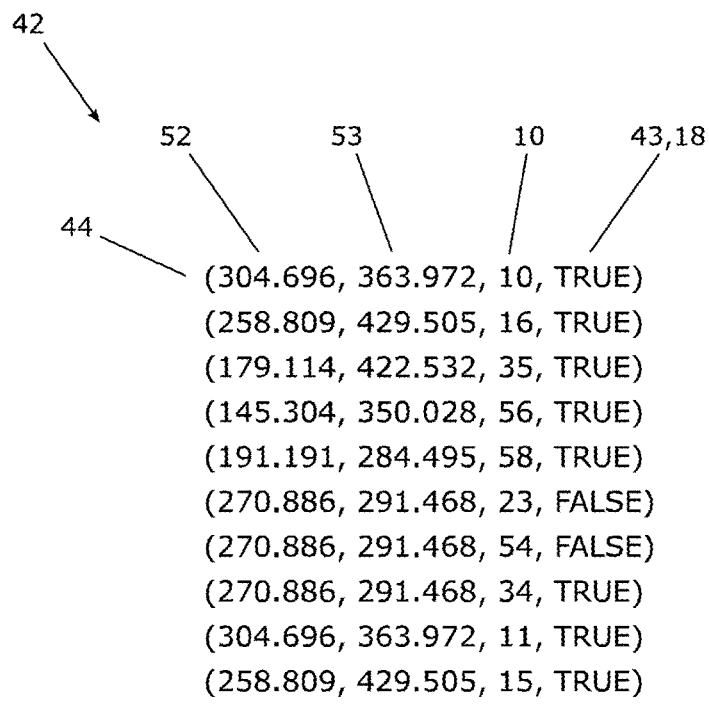
FIG. 4 shows a data format 42 for storing the associated numbers 10 of fluorescence photons and scan positions 9 with an identifier 43.

FIG. 4 shows a possible data format 42 for storing the data. For each of the scan positions 9 of the local intensity minimum 4, the data set contains an entry in the form of a tuple 44 comprising the x-coordinate 52 and the y-coordinate 53 of the intensity minimum 4, the number 10 of detected fluorescence photons and an identifier 43 in the form of a Boolean truth value 18.

Here, TRUE values indicate that the disturbances were below a threshold value during the fluorescence detection of the respective scan position, and FALSE values indicate that the disturbances were above a threshold value during at least one time point 50 during the fluorescence detection of the respective scan position. A z-coordinate can easily be added to the data format 42 (not shown) if the coordinates are available in three dimensions. This data format 42 is particularly suitable if the disturbances are detected with a sensor 32 whose output only indicates the exceeding of a limit value in digital form, but not the magnitude of the disturbance signal 46 in quantitative form.

Figure 5:
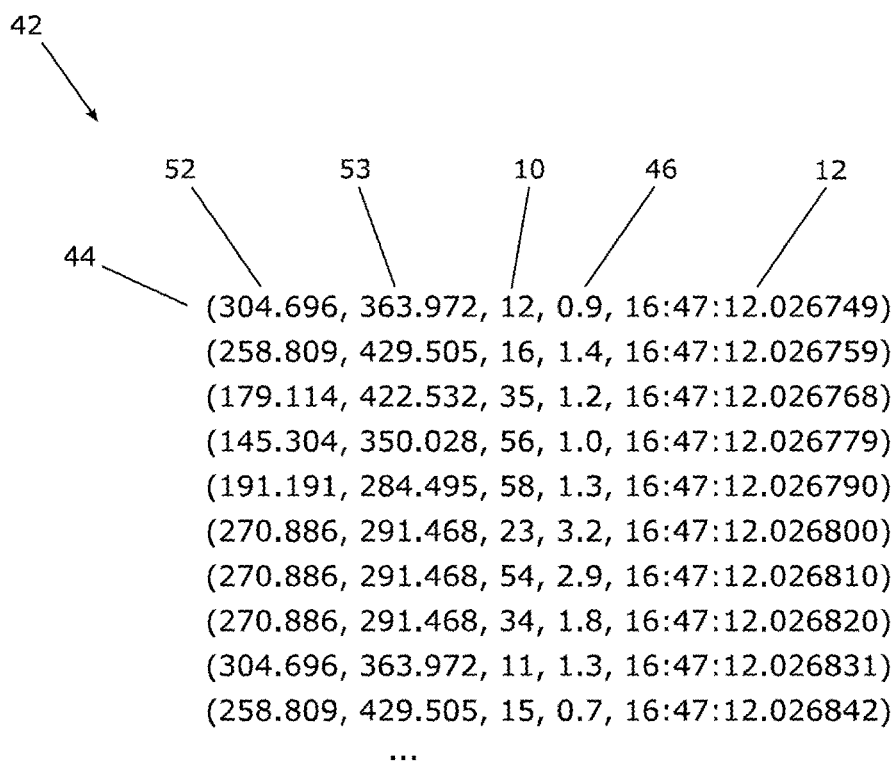
FIG. 5 shows a data format 42 for storing the associated numbers 10 of fluorescence photons and scan positions 9 with the respective magnitude of the disturbance signal 46 and a time stamp 12.

FIG. 5 shows another possible data format 42 for storing the data. Deviating from the data format 42 shown in FIG. 4, here not only a Boolean truth value 18 is stored, which indicates an exceeding of the limit value of the disturbance, but the disturbance is also stored as a quantitative value of the disturbance signal 46. Furthermore, each tuple 44 is assigned a time stamp 12 that reflects the time of the data recording of the respective tuple 44. This data format 42 is advantageous if the disturbance can be recorded quantitatively in real time, so that the limit value does not have to be determined a priori but can also be determined in the course of a subsequent, separate data evaluation. This also allows a comparative analysis of data with different limit setting. The data format is also suitable for determining the location of the fluorescence dye molecule 3 taking into account a further disturbance signal 46 recorded with a sensor 32 and stored separately, also with a time stamp.

Figure 6:
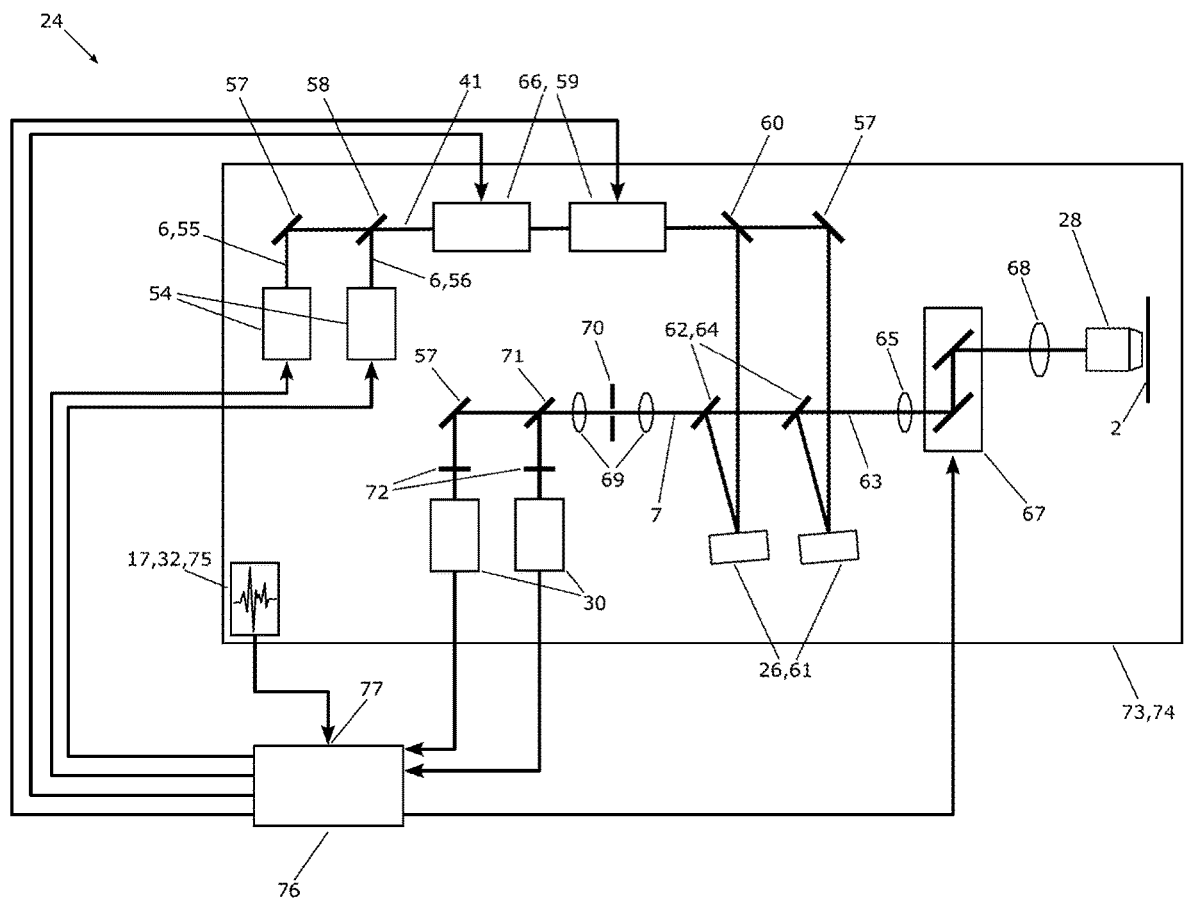
FIG. 6 shows an embodiment of the laser scanning microscope 24 according to the present disclosure.

FIG. 6 shows as an example and schematically the set-up of a laser scanning microscope 24 for carrying out the method according to the present disclosure with two fluorescence dyes emitting at different emission wavelengths. Two laser light sources 54 provide excitation light 6 of different wavelengths 55 and 56, which is combined with a beam coupler 58 to form a common excitation light beam 41. The excitation light beam 41 now passes through a beam deflection device 66, here in the form of two electro-optical deflectors (EODs) 59 connected in series, for deflecting the excitation light beam 41 in the horizontal or vertical direction. After passing through the EODs 59, the two excitation wavelengths 55, 56 are once again separated by a beam splitter 60, and their wave fronts are shaped by two separate phase modulation elements 26, here in the form of two liquid crystal modulators 61 (Spatial Light Modulator, SLM), in such a way that the subsequent focusing by the microscope objective 28 results in an intensity distribution 5 of the excitation light 6 in the sample 2, which has a local intensity minimum 4. The light beams reflected from the liquid crystal modulators 61 are coupled into a main beam path 63 of the laser scanning microscope 24 by beam couplers 62. The beam couplers 62 are advantageously designed as narrow band reflecting dielectric notch filters 64 whose reflection range overlaps as little as possible with the emission spectrum of the fluorescence dyes, so that only small portions of the fluorescence light 7 running in the main beam path 63 in the opposite direction to the excitation light 6 are reflected out of the main beam path 63. The excitation light 6 is directed into the rear aperture of the objective 28 by a scan lens 65, a scanner 67 shown here as an example in a quad configuration for only one scanning direction, and a tube lens 68. A further light beam coupled into the main beam path 63 together with the excitation light for photoactivation of fluorescence dye molecules 3 into the fluorescent state 22 is not shown in the figure for simplicity. In the configuration shown, the scanner 67 serves to provide a comparatively slow coarse positioning of the focused excitation light 6 on a fluorescence dye molecule 3 in the fluorescent state 22 in the sample 2, which is possible over a large image field, while the EODs 59 form a beam deflection device 66 serving to provide the rapid positioning of the intensity minimum 4 at several scan positions 9 arranged closely around the assumed location 1 of the dye molecule. In this case, the EODs 59 allow positioning at high speed, but with a positioning range limited to a few micrometers. Alternatively, the beam deflection device 66 could, for example, also be formed by a fiber bundle with light emission ends of individual fibers, which are positioned in the beam path in such a way that the individual light emission ends are each assigned to different scan positions 9, whereby a switching device is additionally provided, which causes individual fibers of the bundle to guide light sequentially in time. Other designs of the beam deflection device 66 are also possible; the only decisive factor is that the beam deflection device 66 is configured so that adjacent scan positions 9 can be sequentially supplied with excitation light. Alternatively, a device integrating the scanner 67 and the beam deflection device 66 may be provided; such a device may, for example, be formed with a so-called deformable mirror. In further alternative embodiments, the function of the scanner 67 could, for example, be performed by a movable sample stage. The fluorescence light 7 received by the objective 28 from the sample 2 propagates along the main beam path 63 in the opposite direction to the excitation light 6, being transmitted by the beam couplers 62. The fluorescence light 7 is focused by a lens 69 through a confocal pinhole 70, collimated by another lens 69 and split by a dichroic beam splitter 71 into two wavelength regions comprising the emission range of one and the other fluorescence dye, respectively. The fluorescence light 7 is separated from scattered light in each case with a band-pass filter 72 and detected with two detectors 30. The optical components of the laser scanning microscope 24 are connected via a common mechanical carrier 73, for example an optical mounting plate 74. According to the present disclosure, a measuring device 17 with a sensor 32 for a disturbance is coupled to the mechanical carrier 73, which is designed here as a vibration sensor 75 and serves to measure vibrations coupled to the measuring system via the common carrier 73 or via air movements. The laser scanning microscope 24 comprises a control unit 76 with a sequence control for executing the method shown in FIG. 1 or in FIG. 2 and functional units for controlling the laser light sources 54, the scanner 67 and the EODs 59 and for processing the fluorescence light signals detected by the detectors 30 and storing them in a data memory 45, for example in one of the data formats 42 shown in FIG. 4 or FIG. 5. The control unit 76 may include further functions, in particular analysis and visualization functions. The functional units may be integrated or designed as separate units. For carrying out the method according to the present disclosure, the control unit 76 comprises a signal input 77 for the disturbance registered by the sensor 32. The sequence control is configured in such a way that, each time a fluorescence intensity is measured, it also records the current measured value of the sensor 32 and stores it together with the number of fluorescence photons detected and the current position of the intensity minimum 4 of the intensity distribution 5. If the sensor 32 only indicates the exceeding of a limit value in digital form, the sequence control stores an identifier indicating the exceeding of the limit value with the fluorescence intensity. Alternatively, the sequence control is configured to suspend the measurement when a first limit value 20 of the disturbance signal is exceeded until the disturbance signal is again below the first limit value or a second limit value 21.

Figure 7:
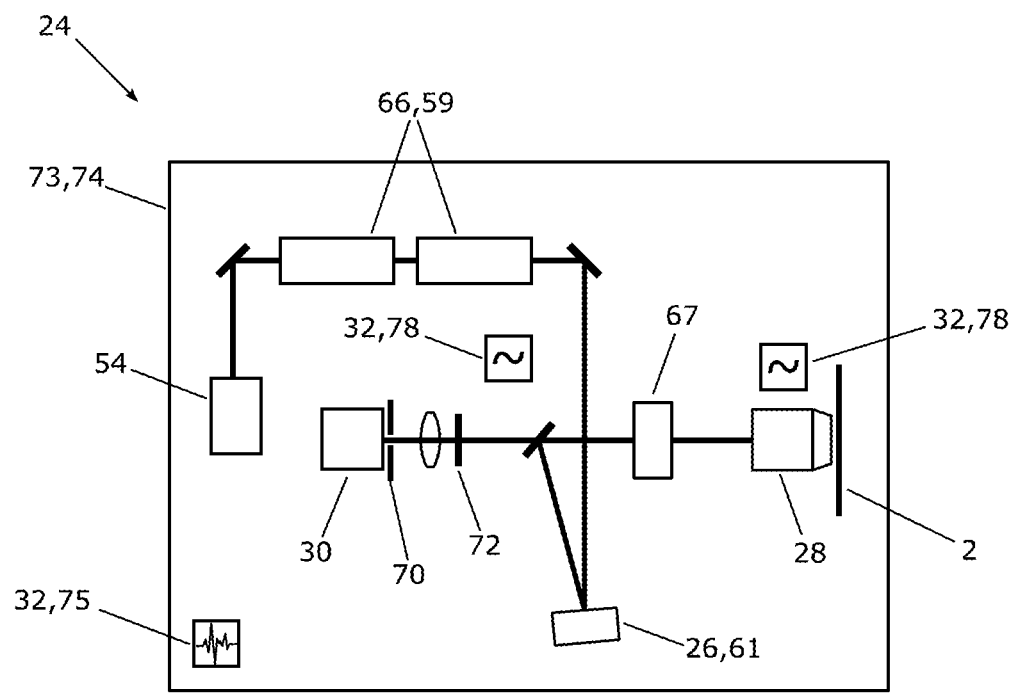
FIG. 7 shows a preferred embodiment of the laser scanning microscope 24 according to the present disclosure with multiple sensors 32.

The laser scanning microscope 24 according to the present disclosure shown in FIG. 7 corresponds in its construction to the laser scanning microscope 24 shown in FIG. 6, but here it is equipped with only one laser light source 54 for providing excitation light 6 of a wavelength 55 and only one detector 30 for detecting fluorescence light 7. Accordingly, the beam splitters 58, 60, 71 and beam couplers 62 for combining or separating the excitation light 6 of different wavelengths 55, 56 and for separating the fluorescence light 7 of different wavelengths are also omitted. Deviating from FIG. 6, the laser scanning microscope shown here is equipped with several sensors 32 positioned at different locations, wherein one sensor 32 is designed as a vibration sensor 75 and two further sensors 32 are designed as flow sensors 78. The vibration sensor 75 is mechanically connected to the mounting plate 74. The flow sensors 78 are positioned at particularly sensitive or particularly exposed locations of the laser scanning microscope 24, for example in the vicinity of the objective 28 or in the vicinity of open beam paths.

Figure 8:
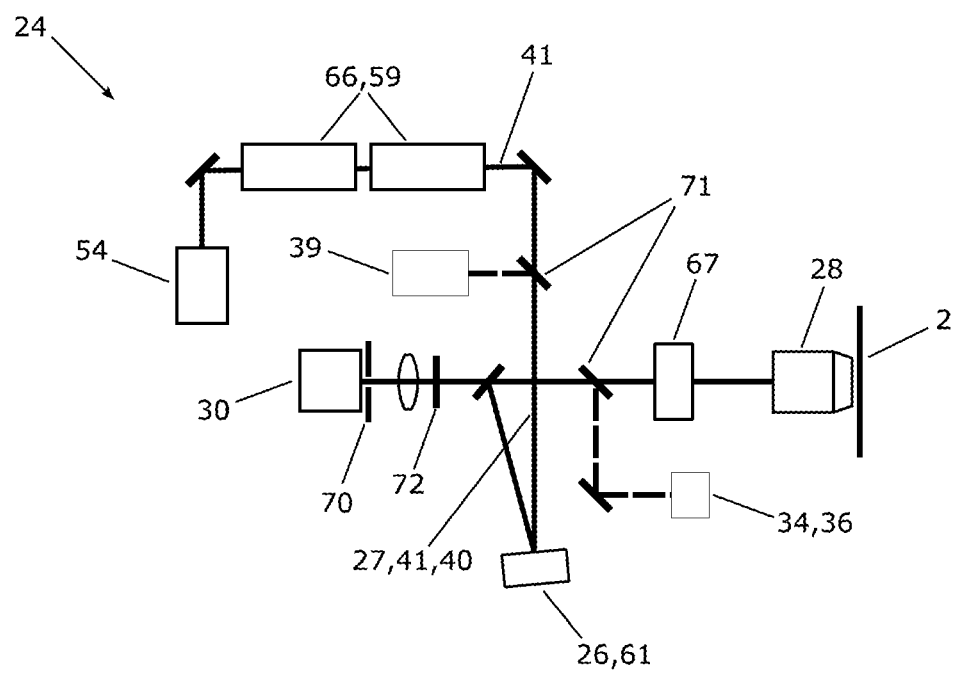
FIG. 8 shows a preferred embodiment of the laser scanning microscope 24 according to the present disclosure with a measuring light beam 40 coupled into the beam path 27 of the excitation light and a segmented detector 36.

The laser scanning microscope 24 according to the present disclosure shown in FIG. 8 corresponds in its construction to the laser scanning microscope 24 shown in FIG. 7, but the measuring device 17 for detecting a disturbance is formed by an auxiliary light source 39, for example a laser emitting in the infrared spectral range, and a light detector 34 in the form of a segmented detector 36. Therein, the measuring light beam 40 emitted by the auxiliary light source 39 is coupled into the beam path 27 with the aid of two dichroic beam splitters 71 and coupled out again at another point, so that the measuring light beam 40 runs partially in the beam path 27 of the excitation light 41. Any disturbances that are transmitted to the beam-conducting elements 79 of the excitation light 6 and lead to a change in the position of the focused excitation light 6 in the sample 2 are thus also transmitted to the measuring light beam 40 and can be detected by a change of the position of the measuring light beam 40 on the segmented detector 36.

Figure 9:
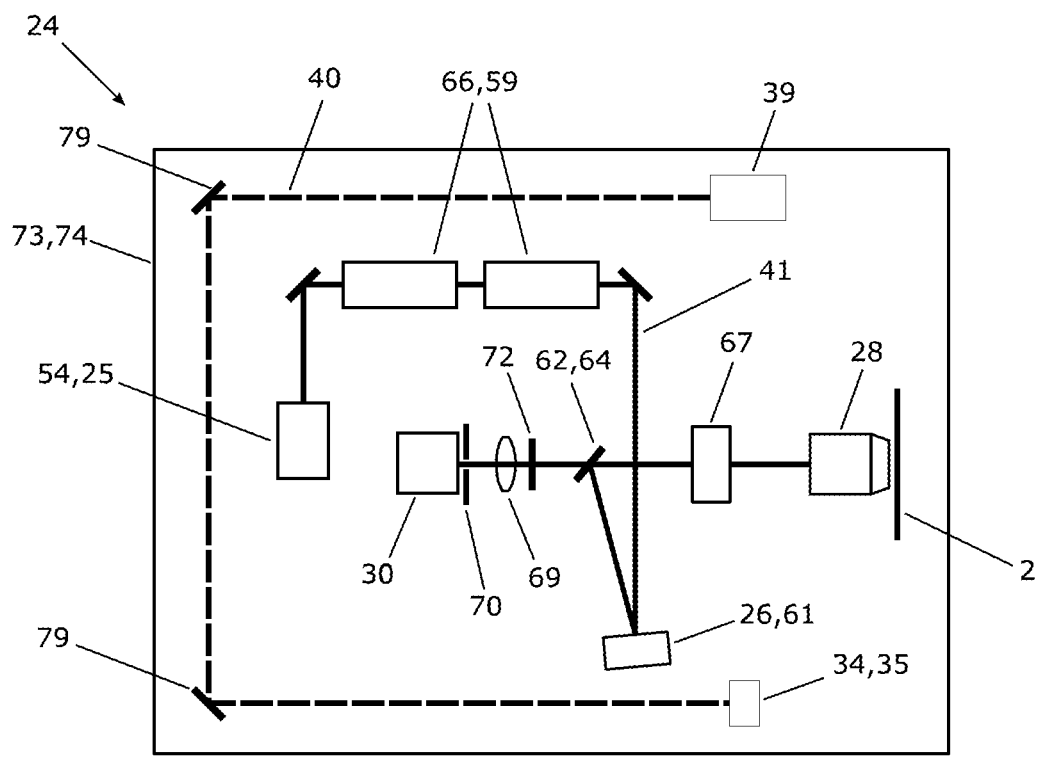
FIG. 9 shows a preferred embodiment of the laser scanning microscope 24 according to the present disclosure with a measuring light beam 40 provided by an auxiliary light source 39 and a position-sensitive detector 35.

The laser scanning microscope 24 according to the present disclosure shown in FIG. 9 corresponds in its construction to the laser scanning microscope 24 shown in FIG. 8, but here the measuring light beam 40 does not run partially together with the excitation light beam 41, but completely separately from it. A position-sensitive detector 35, for example a position-sensitive large-area analogue photodiode or a quadrant diode, is provided here as the light detector 34. Disturbances which are transmitted to the elements of the laser scanning microscope 24 via the common mechanical carrier 73 also reach the measuring light beam 40 via the beam-conducting elements 79 of the measuring light beam 40 as well as the mounting of the auxiliary light source 39 and lead to a change in position of the measuring light beam 40 on the position-sensitive detector 35. Also, the measuring light beam 40, like the excitation light beam 41, is influenced by acoustic disturbances or by air currents and can therefore detect them.

Figure 10:
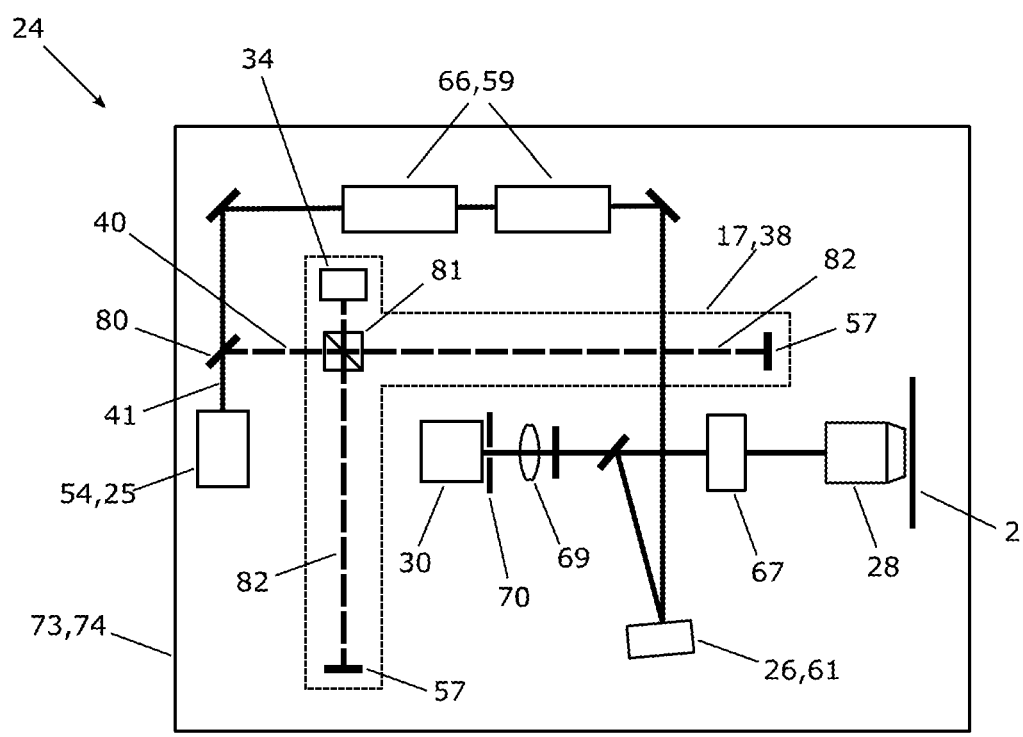
FIG. 10 shows a preferred embodiment of the laser scanning microscope 24 according to the present disclosure with a measuring light beam 40 coupled out of the excitation beam path 41 and a measuring device 17 comprising an interferometer 38.

The laser scanning microscope 24 according to the present disclosure shown in FIG. 10 corresponds in its construction to the laser scanning microscope 24 shown in FIG. 8, but the measuring light beam 40 is not provided here by an auxiliary light source 39 but is coupled out of the excitation beam 41 with a beam splitter 80. The measuring device 17 for measuring the disturbance is designed here as a (Michelson) interferometer 38 with a beam splitter cube 81 and two mirrors 57 for back reflection of the two partial beams 82; other interferometer types can also be used, in particular Mach-Zehnder interferometers. The arms of the interferometer 38 are spatially close to the beam paths of the excitation light 6 and the fluorescence light 7, and the mirror(s) 57 of the interferometer 38 are mounted on the same mechanical carrier 73 as the other components of the laser scanning microscope 24. Alternatively, it is also possible to mount the mirror(s) 57 on one of the other components of the laser scanning microscope 24. Behind the exit port of the interferometer 38 is placed the light detector 34, for example a photodiode or a photomultiplier. By its nature, the interferometer 38 is very sensitive to vibrations, to (turbulent) air currents and sound and translates these disturbances into brightness variations on the light detector 34. To further increase the sensitivity, the interferogram can also be recorded with a spatially resolving detector, especially a camera, and the disturbance pattern can be examined for changes with image processing.

Figure 11:
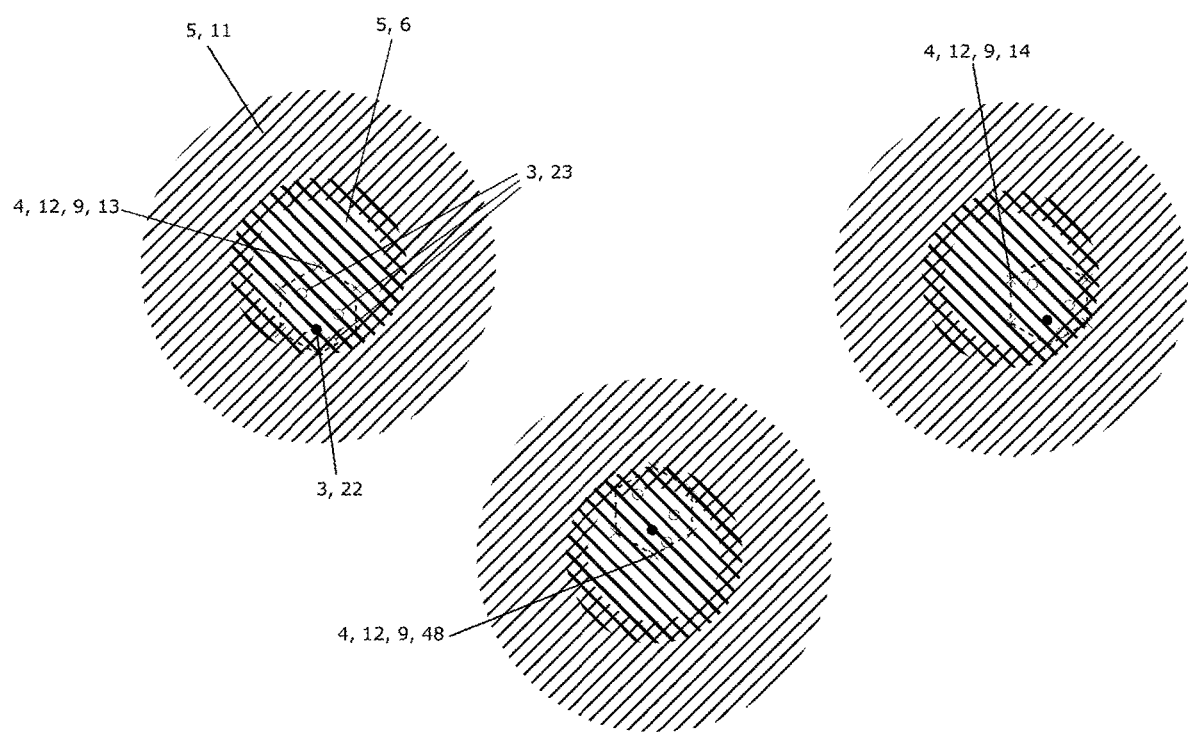
FIG. 11 shows three scan positions 9 from the sequence 8 of scanning steps of a method variant in which the fluorescence dye molecule 3 is illuminated with excitation light 6 and fluorescence-preventing light 11.

In FIG. 11, three scan positions 9 from the sequence 8 of a method variant according to the present disclosure are shown, in which the fluorescence dye molecule 3 in the fluorescent state 22 is illuminated with an intensity distribution 5 of excitation light 6 having a local intensity maximum 12 and an intensity distribution 5 of fluorescence-preventing light 11 having a local intensity minimum 4. The scan positions 9 are arranged on the corners of a regular hexagon as in FIG. 3, but the illumination of the fluorescence dye molecule 3 at the first scan position 13, the second scan position 48 and the third scan position is not performed here along an orbital direction of the hexagon, but in an arbitrary order.

The invention claimed is:

1. A method for determining locations of individual fluorescence dye molecules coupled to a structure in a sample comprising the steps of
    sequentially illuminating on of an individual, spatially isolated fluorescence dye molecule by an intensity distribution of an excitation light comprising a local intensity minimum or by an intensity distribution of an excitation light and an intensity distribution of a fluorescence-preventing light comprising a local intensity minimum and substantially complementary to the intensity distribution of the excitation light at a sequence of different scan positions of the local intensity minimum for exciting the fluorescence dye molecule to emit fluorescence light;
    detecting the number of fluorescence photons of the fluorescence light and assigning the number of fluorescence photons to the respective scan position at each step of the sequence;
    determining the location of the fluorescence dye molecule from the set of associated numbers of fluorescence photons and scan positions with an accuracy below a dimension of a diffraction-limited volume in a spatial direction;
wherein during the illumination of the sample the magnitude of a disturbance is determined and a weighting factor is assigned to each element of the set of associated numbers of fluorescence photons and scan positions, the value of which is determined from the magnitude of the disturbance during the detection of the fluorescence photons at the respective scan position, and wherein the elements of the set of assigned numbers of fluorescence photons and scan positions are taken into account in accordance with their weighting factor when determining the location of the fluorescence dye molecule.

2. The method according to claim 1, wherein the intensity comprising distribution comprising the local intensity minimum is the same for all scan positions except for a translation.

3. The method according to claim 1 wherein the magnitude of the disturbance is stored as a function of time.

4. The method according to claim 1 wherein the weighting factor is assigned the value zero if during the detection of the fluorescence photons the magnitude of the disturbance has reached or exceeded a threshold value.

5. The method according to claim 1 wherein discrete values are assigned to the weighting factors.

6. The method according to claim 5, wherein the discrete values are binary values indicating the presence or absence or exceeding of a limit value of the disturbance.

7. The method according to claim 1, characterized in that wherein the disturbance is detected with a vibration sensor, an acceleration sensor, an optical, capacitive or inductive distance sensor, a position sensor, a microphone, a pressure sensor, a flow sensor, a temperature sensor or with a combination of different such sensors.

8. The method according to claim 1, wherein the disturbance is detected by decoupling a small part of the excitation light from a beam path of the excitation light and directing it onto a light detector.

9. The method according to claim 8, wherein the light detector is configured as a position-sensitive detector and/or as a segmented detector.

10. The method according to, claim 8 wherein an interferometer is arranged in front of the light detector.

11. The method according to claim 1, characterized in that wherein the disturbance is detected by means of a measuring light beam and a light detector.

12. The method according to claim 1, characterized in that wherein the location of the fluorescence dye molecule is determined repeatedly.

13. The method according to claim 12, wherein a trajectory of the fluorescence dye molecule in the sample is generated from the locations of the fluorescence dye molecule.

14. The method according to claim 1, characterized in that wherein the locations of several different dye molecules are determined by the method.

15. The method according to claim 14, wherein a high-resolution image of the structure in the sample is generated from the locations of the dye molecules.

16. A laser scanning microscope comprising
    a laser light source for providing excitation light;
    a phase modulation element in a beam path of the excitation light;
    an objective configured to focus the excitation light into a sample and to receive fluorescence light from the sample;
    a beam deflection device configured to deflect the excitation light;
    a detector for fluorescence light received from the sample,
    a measuring device for detecting a disturbance, and
    a control unit comprising a signal input configured to receive the disturbance detected by the measuring device, wherein the control unit is configured to assign a weighting factor to each element of a set of associated numbers of fluorescence photons detected by the detector and scan positions of the deflected excitation light, and determine the value of said weighting factor from the magnitude of the disturbance, and wherein the control unit is configured to take the elements of the set of assigned numbers of fluorescence photons and scan positions into account in accordance with their weighting factor when determining the location of the fluorescence dye molecule by the method according to claim 1.

17. A laser scanning microscope comprising
    a laser light source for providing excitation light;
    a laser light source for providing fluorescence-preventing light;
    a phase modulation element in a beam path of the fluorescence-preventing light;

an objective configured to focus the excitation light and the fluorescence-- preventing light into a sample and to receive fluorescence light from the sample;

at least one beam deflection device configured to deflect the excitation light and the fluorescence-preventing light, a measuring device for detecting a disturbance; and a control unit comprising a signal input configured to receive the disturbance detected by the measuring device, wherein the control unit is configured to assign a weighting factor to each element of a set of associated numbers of fluorescence photons detected by the detector and scan positions of the deflected excitation light and fluorescence-preventing light, and determine the value of said weighting factor from the magnitude of the disturbance, and wherein the control unit is configured to take the elements of the set of assigned numbers of fluorescence photons and scan positions into account in accordance with their weighting factor when determining the location of the fluorescence dye molecule by the method according to claim 1.

18. A method for determining locations of individual fluorescence dye molecules coupled to a structure in a sample comprising the steps of sequentially illuminating an individual, spatially isolated fluorescence dye molecule by an intensity distribution of an excitation light comprising a local intensity minimum or by an intensity distribution of an excitation light and an intensity distribution of a fluorescence-preventing light comprising a local intensity minimum and substantially complementary to the intensity distribution of the excitation light at a sequence of different scan positions of the local intensity minimum for exciting the fluorescence dye molecule to emit fluorescence light;

detecting the number of fluorescence photons of the fluorescence light and assigning the number of fluorescence photons to the respective scan position at each step of the sequence;

determining the location of the fluorescence dye molecule from the set of associated numbers of fluorescence photons and scan positions with an accuracy below a dimension of a diffraction-limited volume in a spatial direction;

wherein during the illumination of the sample the magnitude of a disturbance is determined, and wherein the illumination of the dye molecule at the sequence of scan positions and the detection of the fluorescence photons is interrupted when the magnitude of the disturbance exceeds a first limit value.

19. The method according to claim 18, wherein the illumination of the dye molecule at the sequence of scan positions is continued when the magnitude of the disturbance falls below a second limit value.

20. The method according to claim 19, wherein the second limit value is smaller than the first limit value.

* * * * *